United States Patent
Bortolato et al.

(10) Patent No.: US 12,263,745 B2
(45) Date of Patent: Apr. 1, 2025

(54) HEAVY-CURRENT CHARGING CABLE FOR CHARGING AN ELECTRIC VEHICLE

(71) Applicant: ABB E-mobility B.V., Delft (NL)

(72) Inventors: Matteo Bortolato, Trebaseleghe (IT); Emmanuel Logakis, Baden-Dättwil (CH); Moritz Boehm, Mellingen (CH); Jean-Marc Oppliger, Fislisbach (CH)

(73) Assignee: ABB E-mobility B.V., Delft (NL)

( * ) Notice: Subject to any disclaimer, the term of this patent is extended or adjusted under 35 U.S.C. 154(b) by 566 days.

(21) Appl. No.: 17/583,343

(22) Filed: Jan. 25, 2022

(65) Prior Publication Data

US 2022/0144112 A1     May 12, 2022

Related U.S. Application Data

(63) Continuation of application No. PCT/EP2019/077984, filed on Oct. 15, 2019.

(30) Foreign Application Priority Data

Jul. 25, 2019   (EP) ..................................... 19188409

(51) Int. Cl.
*B60L 53/302*     (2019.01)
*B60L 53/16*     (2019.01)
(Continued)

(52) U.S. Cl.
CPC .............. *B60L 53/18* (2019.02); *B60L 53/16* (2019.02); *B60L 53/302* (2019.02); *H01B 7/425* (2013.01); *H01B 9/006* (2013.01)

(58) Field of Classification Search
CPC ........ B60L 53/18; B60L 53/16; B60L 53/302; H01B 7/425; H01B 9/006; Y02T 90/12; Y02T 10/70; Y02T 10/7072; Y02T 90/01
See application file for complete search history.

(56) References Cited

U.S. PATENT DOCUMENTS

| | | | |
|---|---|---|---|
| 10,029,575 B2 * | 7/2018 | Remisch | .............. H01R 13/005 |
| 2009/0167078 A1 | 7/2009 | Watanabe | |

(Continued)

FOREIGN PATENT DOCUMENTS

| | | |
|---|---|---|
| CN | 203787125 U | 8/2014 |
| CN | 106887277 A | 6/2017 |

(Continued)

OTHER PUBLICATIONS

European Patent Office, International Search Report in International Patent Application No. PCT/EP2019/077984, 4 pp. (Apr. 6, 2020).

(Continued)

*Primary Examiner* — Nghia M Doan
(74) *Attorney, Agent, or Firm* — Leydig, Voit & Mayer, Ltd.

(57) ABSTRACT

A charging cable includes a ground conductor and extending in a longitudinal direction, at least two heavy-current power wires for conducting positive and negative direct current, each comprising a power conductor and insulation, the heavy-current power wires extending parallel to the ground wire, a liquid tight inner sheath extending in the longitudinal direction and surrounding the heavy-current power wires to define a first hollow area between and around the heavy-current power wires, liquid coolant being provided between the heavy-current power wires along the longitudinal direction, wherein the liquid tight inner sheath comprises a second hollow area extending in the longitudinal direction, arranged adjacent to at least one of the heavy-current power wires and comprising liquid coolant to flow within the second hollow area, and a liquid tight outer sheath extending in the longitudinal direction and surrounding the inner sheath and the ground heavy-current wire.

15 Claims, 2 Drawing Sheets

Figure 1:
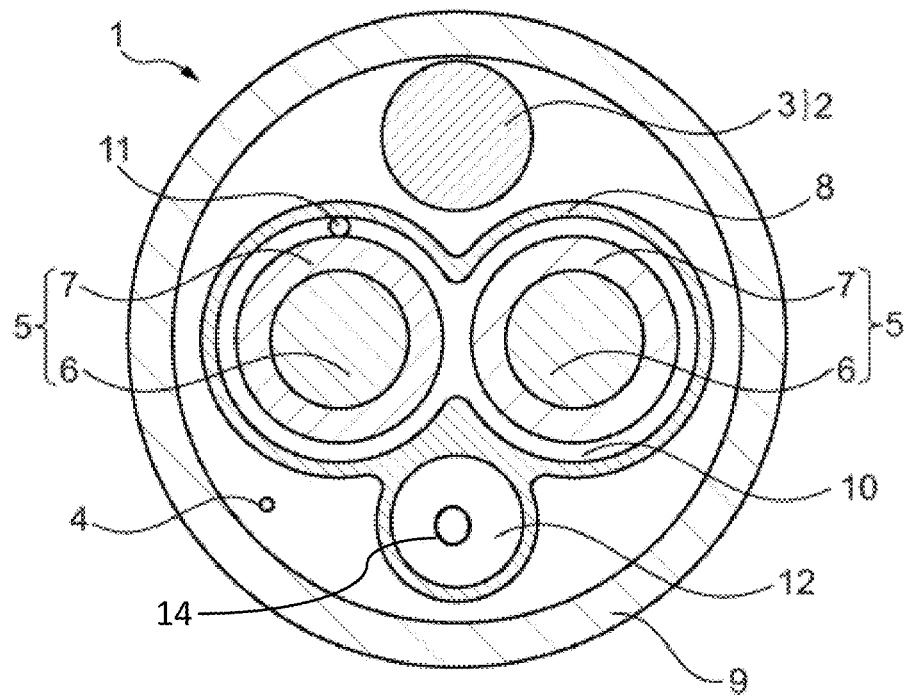

(51) Int. Cl.
*B60L 53/18* (2019.01)
*H01B 7/42* (2006.01)
*H01B 9/00* (2006.01)

(56) References Cited

U.S. PATENT DOCUMENTS

| | | | |
|---|---|---|---|
| 2018/0190410 A1* | 7/2018 | Cao | H01B 9/006 |
| 2018/0277283 A1* | 9/2018 | Remisch | B60L 53/16 |
| 2019/0074620 A1 | 3/2019 | Moseke | |
| 2019/0131035 A1 | 5/2019 | Führer et al. | |
| 2019/0214161 A1* | 7/2019 | Chen | B60L 50/64 |
| 2019/0217728 A1* | 7/2019 | Reber | B60L 53/18 |
| 2021/0063457 A1* | 3/2021 | Frommberger | B60L 53/60 |

FOREIGN PATENT DOCUMENTS

| | | |
|---|---|---|
| CN | 108630343 A | 10/2018 |
| CN | 108701513 A | 10/2018 |
| CN | 110040005 A | 7/2019 |
| DE | 202015009535 U1 | 2/2018 |
| DE | 102017217506 A1 | 4/2019 |
| GB | 1525270 A | 9/1978 |
| JP | 8-66778 A | 3/1996 |

OTHER PUBLICATIONS

European Patent Office, Written Opinion in International Patent Application No. PCT/EP2019/077984, 8 pp. (Apr. 6, 2020).

\* cited by examiner though if it is to a heavy current charging cable for charging an electric vehicle.

HEAVY-CURRENT CHARGING CABLE FOR CHARGING AN ELECTRIC VEHICLE

CROSS-REFERENCE TO RELATED APPLICATIONS

This patent application is a continuation of International patent application no. PCT/EP2019/077984, filed on Oct. 15, 2019, which claims priority to European patent application 19188409.7, filed on Jul. 25, 2019, which are incorporated herein in their entirety by reference.

FIELD OF THE DISCLOSURE

The present disclosure relates to a heavy-current charging cable for charging an electric vehicle.

BACKGROUND OF THE INVENTION

Conventional charging cables for charging electric vehicles, in particular non-cooled or air cooled charging cables, are used in applications where a charging current is below 250 A. For higher currents, conventional solutions would require a very large cross section of the charging cables. As a consequence they would become too heavy and stiff for the user.

At charging currents above 250 A, an active liquid cooling system is essential for removing heat generated by Joule effect both in the charging cable and in a charging connector connected to the charging cable. Such active liquid cooling system typically comprises a liquid coolant, such as for example a synthetic coolant, oil, water/glycol or water/salts mixtures, halogenated hydrocarbon compounds, etc., for removing heat from conductors and power contact elements of the charging connector to finally release the removed heat to ambient air in a cooling unit.

Non insulating coolants, like water/glycol mixtures, can be used only when no contact with a living part i.e. carrying current is assured. Such non-insulating coolants provide some interesting respectively advantageous features. First, these mixtures exhibit better thermal properties in terms of specific heat and low-temperature viscosity. Second, such mixtures are chemically compatible with a variety of materials, including rubber-like polymeric materials to be used for electrical insulation, as for example silicone rubbers or thermoplastic elastomers. Such materials remain soft even at low temperature. On the other hand, the cooling performance is penalized due to presence of insulating, and poor thermally conducting, layers between the conductors and the cooling liquid, limiting in existing solutions known from prior art, the maximum allowed power rating of the liquid cooled charging cable.

In more advanced solutions, the liquid coolant flows directly around the bare and thus uninsulated conductors providing in principle more efficient cooling. Nevertheless, said existing solutions do not have good thermal performance when heat removed by conductors is direct released to the ambient air. In order to stay within the temperature limit of the commonly used materials, such as for example cross-linked polyethylene, a derating of the maximum charging current is needed at ambient temperature above 30 to 35° C. Working at the very limit of the material temperature is not recommended for reliability. Moreover, adopted materials however become brittle, thus less reliable, at low temperatures. Finally, the selected fluids have generally very high viscosity at low temperature or are not environmentally friendly. Currently available data on chemical compatibility between these fluids and the material is scarce and questionable. Furthermore, in existing solutions, coolant flow can be easily blocked as an example by inner clogging or pipe crushing, which represents potentially a safety issue, especially during a charging session because a thermal runaway can be extremely fast and an interlock system in a charge post may only intervene with a certain delay.

In order to decrease the working temperature of conductor wires at high ambient temperature, a cooling unit having a refrigeration loop can be used. In this way, the maximum coolant temperature is almost independent on the ambient air temperature. In an evaporator, i.e. in the refrigerant-to-coolant heat exchanger, the heat coming from the conductors is transferred to the refrigerant. The refrigerant is then compressed and the heat is finally released to ambient air in a condenser. Such a cooling unit includes many more components as compared to the simple cooling unit with a coolant-to-air heat exchanger. This makes the refrigeration based cooling unit more expensive and less reliable.

BRIEF SUMMARY OF THE INVENTION

A heavy-current charging cable for charging an electric vehicle includes a ground heavy-current wire configured for serving as ground, the ground heavy-current wire comprising a ground conductor and ex-tending in a longitudinal direction, and at least two heavy-current power wires configured for conducting positive and negative direct current, DC, each of said heavy-current power wires comprising a power conductor and a power wire insulation surrounding said power conductor, the heavy-current power wires extending parallel to the ground wire. The disclosure further relates to an electric vehicle supply equipment comprising the heavy-current charging cable and a cooling unit, as well as to a respective method for cooling a heavy-current charging cable.

BRIEF DESCRIPTION OF THE SEVERAL VIEWS OF THE DRAWING(S)

The various aspects of the disclosure will be apparent from and elucidated with reference to the implementations described hereinafter.

Figure 2:
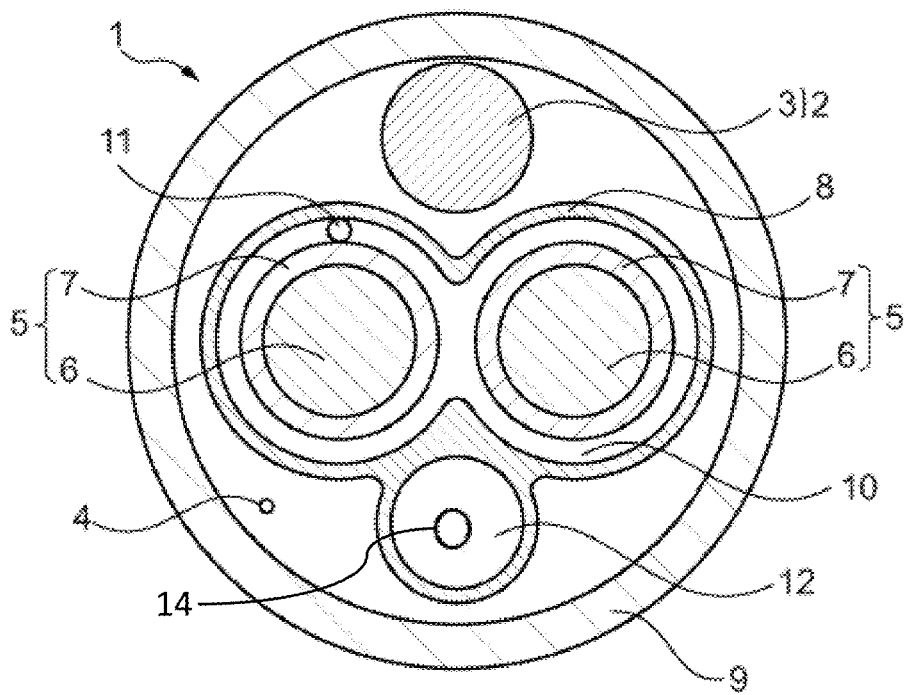
Figure 3:
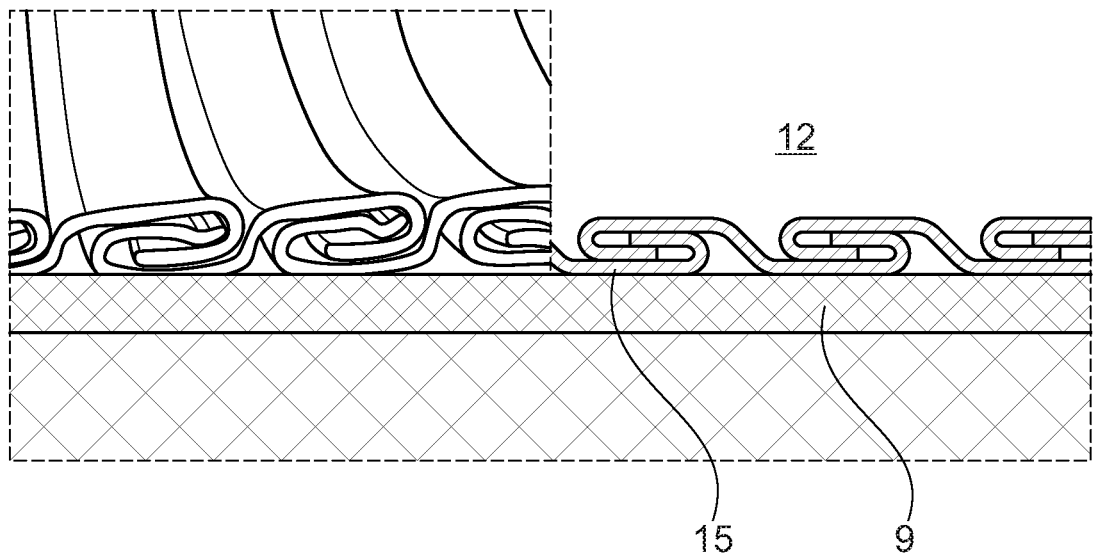
Figure 4:
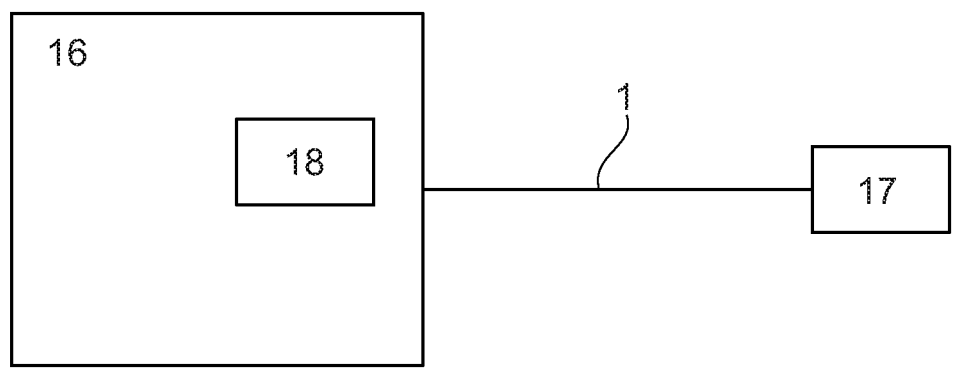

In the drawings:

FIG. 1 shows a heavy-current charging cable according to a preferred implementation in a sectional view, FIG. 2 shows a heavy-current charging cable according to another preferred implementation in a sectional view, FIG. 3 shows a flexible metal tube for the heavy-current charging cable according to FIG. 1 or 2 in two sectional views, and FIG. 4 shows an electric vehicle supply equipment comprising the cable of FIG. 1 or 2 according to a preferred implementation in a schematic view.

DETAILED DESCRIPTION OF THE INVENTION

In one aspect, the present disclosure describes a charging cable and respective charge post solution for overcoming above described limitations thus allowing high power charging at power ratings equal or greater to 500 kW increasing thermal performance while providing mechanical robustness, reliability and safety with the use of simple and cost-effective cooling units.

In another aspect, the present disclosure describes a heavy-current charging cable for charging an electric vehicle, comprising: a ground heavy-current wire configured for serving as ground, the ground heavy-current wire comprising a ground conductor and extending in a longitudinal direction, at least two heavy-current power wires configured for conducting positive and negative direct current, DC, each of said heavy-current power wires comprising a power conductor and a power wire insulation surrounding said power conductor, the heavy-current power wires extending parallel to the ground wire, a liquid tight inner sheath extending in the longitudinal direction and surrounding the heavy-current power wires thereby defining a first hollow area between and around the heavy-current power wires comprising liquid coolant to flow between the heavy-current power wires along the longitudinal direction, a second hollow area extending in the longitudinal direction, arranged adjacent to at least one of the heavy-current power wires and comprising liquid coolant to flow within the second hollow area along the longitudinal direction, and a liquid tight outer sheath extending in the longitudinal direction and surrounding the inner sheath and the ground heavy-current wire.

The proposed solution provides a heavy-current charging cable suitable for High Power Charging, HPC, of Electrical Vehicles, EV. The solution enables charging at 500 A and 1000V, meeting today's standards for fast DC charging, in particular allowing 100 km of driving within 3 to 5 min charging, and can be also adapted to evolving future requirements towards higher ratings such as charging with 600 A at 1500 V i.e. at 900 kW. Compared to prior art solution, the proposed solution provides improved thermal and mechanical performance, safety, reliability and ease in manufacturing and assembly. As revealed by thermal simulations, with a commonly used material for the power wire insulation, a maximum temperature of the respective conductors remains within 90° C. to 100° C. when a current of 500 A is flowing at ambient temperature up to 50° C. As compared to existing solution as known from prior art, the maximum temperature of conductors at 500 A is reduced by 15 to 20° C. The solution is readily scalable towards higher power ratings by suitably modifying the dimensions of the conductors, the inner and outer sheath as well as the flow rate of the coolant.

In one embodiment, the cylindrical design of the outer sheath, of the wires, of the second hollow area and of the cable provides ease during manufacturing of said components and also in assembling the final liquid cooled cable. The core part of the cable comprised of the conductor wires and the inner sheath can be easily pre-assembled. At a second step the aforementioned assembly is inserted into the outer sheath. Thus, the proposed solution is readily scalable towards higher power ratings by suitably modifying the dimensions of the conductors, of the inner and outer sheath as well as the flow rate of the liquid coolant.

The cable can be part of an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids, via said charging cable and a charging connector to the EV. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as more than 500 A and/or in combination with newer standards not yet defined requiring higher currents.

The outer sheath may comprise a cylindrical or cylindrical-like shape respectively design. The first hollow area and/or the second hollow area shall preferably be understood as an 'empty space' through which the liquid coolant can be conveyed respectively flow. The outer sheath can be provided as a cooling jacket and/or as an annular, integral jacket which is extruded on and in which defines the respective hollow chamber. The term heavy-current shall be understood that the conductors and the respective insulation is configured for conveying total currents equal to or greater than 500 A. In a further implementation the cable may comprise a plurality of core wires.

In one embodiment, the liquid tight inner sheath comprises a second hollow area and/or the second hollow area comprises a ring shaped cross section and/or is provided as a round pipe. Thus, the second hollow area can be part of the liquid tight inner sheath or separate thereto, in each case provided within the outer sheath.

According to another embodiment, the first hollow area comprises an eight-like shaped cross section encompassing the power wires each in a ring shaped like cross section of the eight-like shaped cross section. With such implementation the liquid coolant is preferably supplied through a ring respectively round shaped pipe as second hollow area towards a charging connector, while being returned from the charging connector to a cooling unit through such flow "8-shaped" channel as first hollow area containing the insulated conductors of the power wires. Within the eight-like shaped first hollow area the power wires are preferably not separated from each other. In case the second hollow is provided as round pipe such round pipe is preferably attached lateral to the eight-like shaped cross section.

In another embodiment, the cable comprises two heavy-current power wires arranged in the same first hollow area. Both heavy-current power wires are preferably arranged distant to each other in a dis-contiguous manner.

Generally, cross sections of the power wires and of the core wire, thickness of the power wire insulation and of the outer sheath and/or of the inner sheath and/or cable length can be arbitrary. According to a preferred implementation a cross section of the power wires is 50 mm$^2$, a cross section of the ground wire is 25 mm$^2$, a thickness of the power wire insulation is in a range of 1.0 to 2.5 mm, the outer sheath and/or the inner sheath comprises a thickness in a range of 2 to 10 mm, and/or the cable comprises a length of 6 m. The thickness of the conductor insulation layer preferably depends on the coolant that is used. If a water-based coolant is used, then insulated cable rated AD8 (i.e. suitable for permanent water immersion) shall be used. In this case the insulation thickness is preferably in the range of 2.0 to 2.5 mm. If a dielectric coolant is used, the insulation thickness is in the order of 1.0 to 1.5 mm. Said parameters allow charging at 500 A DC and 1000 V DC. Such wise the term heavy-current shall be understood that a total current greater or equal 500 A is meant respectively can be conducted by the respective conductor or wire.

In one embodiment, the liquid coolant comprises oil, a water and glycol mixture, a water and salt mixture, and/or halogenated hydrocarbon compounds. As coolant liquid a non-insulating fluid such as for example water/glycol mixtures can be used since the proposed solution is compatible with indirect cooling approach. According to numerical calculations, with a preferred coolant having a kinematic viscosity at −40° C. lower than 470 cSt, a maximum pressure drop in a 6 m long cable is of 4.7 bar, at a flow rate below 1 l/min, and such wise suitable for thermal control of the cable's conductors.

Inner sheath and/or outer sheath can be generally provided from an ordinary but preferably insulating material. Preferably inner sheath and/or outer sheath are provided as a tube and/or as a sleeving. In a preferred implementation the inner sheath and/or the outer sheath comprise a polymer-based material and/or extruded polymer layers. Most preferably, inner sheath and/or outer sheath comprise polyamide.

In another embodiment, the outer sheath comprises a flexible metal tube arranged between the inner sheath and the outer sheath and whereby the outer sheath is extruded on the flexible metal tube. In an alternative implementation the flexible metal tube is arranged on the outer sheath thereby encompassing the outer sheath. Such flexible metal tube provides enhanced safety and mechanical robustness for the cable. In particular, in case of a damage in the outer sheath the user of the cable is still protected to any exposure to the high voltage cable by both the flexible metal sheath, which is preferably also provided water tight, and the inner sheath. Furthermore, the flexible metal sheath provides required mechanical protection in the event an electric vehicle drives over the liquid cooled cable. Therefore, the flexible metal tube is preferably configured to comprise a lateral crushing strength in the range of 65.5 kN/m. The metal tube may comprise, in cross-section, a strip-wound sheath made from galvanic steel, steel or aluminum, preferably comprising strip-wound profiles to provide necessary flexibility and/or having a bending radius below 300 mm, preferably below 150 mm or around 250 mm.

Generally, the ground conductor and/or the power conductors may comprise an arbitrary conducting material. According to a preferred implementation the ground conductor and/or the power conductors comprise copper and/or aluminium wires and/or wire strands. The proposed cable can be simply and thus cost efficient manufactured, whereby in particular the usage of Aluminium instead of Copper conductors result in significant cost reduction. Aluminium has about 60% of the conductivity of copper but has only 30% of the weight of copper. That means that a bare wire of aluminium weighs half as much as a bare wire of copper that has the same electrical resistance. Thus, by keeping constant the total weight per meter of the cable, usage of Aluminium advantageously results in about half the Ohmic losses as compared to Copper. Special aluminium alloys, such as for example AA-8000 series, exhibit similar to copper creep and elongation properties, meeting the requirements of ASTM B800 for electrical purposes. Thus, thermal performance can be further improved by using Aluminium instead of Copper wires respectively conductors.

According to another embodiment, the power wires and/or the inner sheath are arranged distant from each other and/or comprising wire spacers to arrange the power wires and/or the inner sheath distant from each other. The wire spacers can be provided as plastic spacers and/or are preferably arranged in a regular pattern. The distance respectively size of the wire spacers can be for example 2, 3 or 5 mm such that sufficient liquid coolant can flow in the respective hollow area.

In a further preferred implementation, the cable comprises at least a sensor wire extending in the longitudinal direction and arranged within the inner sheath and/or between the inner sheath and the outer sheath. The first hollow area and/or the second hollow area between the electrical conductors as well as the space between the two sheaths can host in particular thin wires used, for example, for sensing of various parameters such as temperature, humidity, light, acceleration, electrical resistance, etc. either in the charging connector or the liquid cooled cable as such. In a preferred implementation, the sensor wire comprises a Proximity Pilot, PP, wire for pre-insertion signalling and/or a Control Pilot, CP, wire for post-insertion signalling, in particular as per SAE J1772 and/or IEC 61851 standard. Most preferably, the sensor wire or a plurality thereof is arranged between the inner sheath and the outer sheath. Such way safety is also improved by early detection of damages in the outermost layers by placing the Control Pilot and/or Proximity Pilot wire in said hollow second area between the inner and outer sheaths.

In one aspect, the disclosure describes an electric vehicle supply equipment, EVSE, comprising the charging cable as described before, a cooling unit and a charging connector, whereby the charging cable is connected between the cooling unit and the charging connector, the cooling unit is configured for conveying the liquid coolant from the cooling unit through the first second hollow area and/or between the inner sheath and the outer sheath towards the charging connector and the charging connector is configured for returning the liquid coolant through the first hollow area towards the cooling unit.

Compared to prior art solution, the proposed solution provides improved thermal and mechanical performance, and ease in manufacturing and assembly. The cooling unit is preferably configured for conveying a coolant having a kinematic viscosity at −40° C. lower than 470 cSt having a maximum pressure drop in a 6 m long cable of 4.7 bar at a flow rate below 1 l/min. The cooling unit preferably comprises means for storing, cooling and/or conveying the liquid coolant across the entire extension of the cable. Cooling unit, cable and charging connector are preferably provided as closed cooling circuit, in particular by means of the inner sheath and the outer sheath. The configuration of the second hollow area where the heavy-current power wires are embedded is preferably meant to avoid any blocking of the coolant flow nearby the heavy-current power wires, which improves safety of operation as compared to existing solutions. Moreover, this configuration reduces a pressure drop and amount of coolant in the cable as compared to a solution where the heavy-current power wires are embedded in two distinct round pipes.

In one embodiment, the EVSE is configured to charge the electric vehicle with a current rating equal or greater than 500 A DC and/or a voltage rating equal or greater than 1000 V DC. The EVSE may comprise a transformer and/or a converter for connecting to respectively receiving electrical energy from an AC grid, which is transformed and/or converted to DC for being supplied via the charging cable to the electric vehicle connected thereto via the charging connector.

In one additional aspect, the present disclosure describes a method for liquid cooling a heavy-current charging cable for charging an electric vehicle, the cable comprising a ground heavy-current wire configured for serving as ground, the ground heavy-current wire comprising a ground conductor and extending in a longitudinal direction, at least two heavy-current power wires configured for conducting positive and negative direct current, DC, each of said heavy-current power wires comprising a power conductor and a power wire insulation surrounding said power conductor, the heavy-current power wires extending parallel to the ground wire, a liquid tight inner sheath extending in the longitudinal direction and surrounding the heavy-current power wires thereby defining a first hollow area between and around the heavy-current power wires, a second hollow area extending in the longitudinal direction, arranged adjacent to at least one of the heavy-current power wires, and a liquid tight outer sheath extending in the longitudinal direction and surrounding the inner sheath and the ground heavy-current wire, the method comprising the step of: conveying liquid coolant through the first hollow area and the second hollow area.

Further embodiments and advantages of the method are directly and unambiguously derived by the person skilled in the art from the cable as described before.

FIGS. 1 and 2 each show a heavy-current charging cable 1 for charging an electric vehicle according to preferred embodiments in a sectional view. The cable 1 comprises one non-insulated ground heavy-current wire 2 serving as ground comprising a ground conductor 3 extending in a longitudinal direction orthogonal to the figure layer and a ground wire insulation 4 surrounding the ground conductor 3. The ground conductor 2 comprises a cross section of 25 mm$^2$.

The heavy-current charging cable 1 further comprises two heavy-current power wires 5, each one configured for conducting positive and negative direct current, DC, respectively. The two heavy-current power wires 5 each extend parallel to the ground wire 2 and are arranged distant to each other and distant to the ground wire 2. Each heavy-current power wire 5 comprises a power conductor 6 and a power wire insulation 7 surrounding said power conductor 6. Each power conductor 6 comprises a cross section of 50 mm$^2$, while the power wire insulation 7 comprises thickness of 0.5 to 2.5 mm. If a water water-based coolant is used, to be discussed later, then the insulation thickness is in the range of 2.0 to 2.5 mm. If a dielectric coolant is used the insulation thickness is in the order of 1.0 to 1.5 mm. The ground conductor 3 and the power conductors 6 consists of copper, aluminium or a mixture thereof and/or comprise wire strands.

The cable 1 further comprises a liquid tight inner sheath 8 and a liquid tight outer sheath 9 made of a polymer-based material and/or comprising extruded polymer layers, in particular made of polyurethane. Both the liquid tight inner sheath 8 and the liquid tight outer sheath 9 extend in the longitudinal direction, whereby the liquid tight inner sheath 8 surrounds the power wires 5, thereby defining a first hollow area 10. In other words, the liquid tight inner sheath 8 does not surround the power wires 5 such that said wires 5 are arranged tight to each other. Wire spacers 11 are arranged in regular pattern between the power wires 5 and the inner sheath 8 for facilitating such arrangement.

The first hollow area 10 comprises, in cross section, an eight-like shape encompassing the power wires 5 each in a ring shaped like cross section of the eight-like shaped cross section. The cable 1 further comprises a second hollow area 12 extending in the longitudinal direction and arranged adjacent to at least one of the heavy-current power wires 5. The second hollow area 12 can be part of the inner sheath 8 or separated therefrom. In case separated the second hollow area 12 can be provided as a tube made polyurethane. In FIG. 1 and the second hollow area 12 is attached respectively part of the inner sheath 8 and thereby attached to the eight-like shaped section of the inner sheath 8.

The outer sheath 9 surrounds the inner sheath 8 thereby defining a third hollow area between both sheaths 8, 9, not referenced. Sheath spacers, not shown, can be arranged in regular pattern between both sheaths 8, 9 for facilitating such arrangement so that the sheaths 8, 9 do not touch each other at any location. Inner sheath 8 comprises in the area of the ring shaped like cross sections of the eight-like shaped cross section an inner radius of 8.5 mm and an outer radius of 9.5 mm, whereby the outer sheath 9 comprises an inner diameter of 39 mm and an outer diameter of 45 mm. The ring shaped second hollow area 12 comprises an inner diameter of 9 mm.

First hollow area 10 and second hollow area 12 are each filled with a liquid coolant to flow between power wires 5 along the longitudinal direction within the inner sheath 8, in case of the first hollow area 10, and thus around respectively in direct contact with all power wires 5. The liquid coolant comprises oil, a water and glycol mixture, a water and salt mixture, and/or halogenated hydrocarbon compounds. In addition to the liquid coolant, sensor wires 14 are provided in the hollow area 10 and/or second hollow area 12 extending in longitudinal direction for submitting, among others, control pilot, CP, and proximity pilot, PP, signals.

While the implementation of FIG. 1 is dimensioned in regard to the power wires 5 for a water-based coolant, the implementation in FIG. 2 is dimensioned in regard to the power wires 5 for a dielectric coolant. For both implementations, in a flexible metal tube 15 can be provided, as shown in FIG. 3, which is arranged between the inner sheath 8 and the outer sheath 9, whereby the outer sheath 9 is extruded on the flexible metal tube 15. FIG. 3 shows the flexible metal tube 15 in detail in two sectional views besides each other, on the left as semi-perspective view and on the right as sectional view.

FIG. 4 shows an electric vehicle supply equipment, EVSE, 16, which comprising the charging cable 1 and a charging connector 16. The EVSE 16 is connected via a transformer and/or a converter for receiving electrical energy from an AC grid, not shown, which is transformed and/or converted to DC for being supplied via the charging cable 1 having a length of 6 m to the electric vehicle connected thereto via the charging connector 17 to charge the electric vehicle with a current rating greater equal to or greater than 500 A DC and a voltage rating equal to or greater than 1000 V DC. The EVSE 16 comprises a cooling unit 18 having a liquid coolant reservoir, a coolant-to-air heat exchanger and a respective pump for circulating the liquid coolant from the cooling unit 18 through the second hollow area 12 towards the charging connector 17. The charging connector 17 is configured for returning the liquid coolant through the inner sheath 8 towards the cooling unit 18 such that thereby the liquid coolant circulates around the two power wires 5 for cooling the power conductors 6.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by the skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 cable
2 ground heavy-current wire
3 ground conductor
5 heavy-current power wire
6 power conductor
7 power wire insulation
8 inner sheath
9 outer sheath
10 first hollow area
11 wire spacer
12 second hollow area
14 sensor wire
15 metal tube
16 electric vehicle supply equipment
17 charging connector
18 cooling unit All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A heavy-current charging cable for charging an electric vehicle, comprising:
    a ground heavy-current wire configured for serving as ground, the ground heavy-current wire comprising a ground conductor and extending in a longitudinal direction,
    at least two heavy-current power wires configured for conducting positive or negative direct current, DC, each of said heavy-current power wires comprising a power conductor and a power wire insulation surrounding said power conductor, the heavy-current power wires extending parallel to the ground wire,
    a liquid tight inner sheath extending in the longitudinal direction and surrounding the heavy-current power wires thereby defining a first hollow area between and around the heavy-current power wires configured to comprise liquid coolant to flow between the heavy-current power wires along the longitudinal direction, wherein the liquid tight inner sheath comprises:
        a second hollow area extending in the longitudinal direction, arranged adjacent to at least one of the heavy-current power wires and configured to comprise liquid coolant to flow within the second hollow area along the longitudinal direction, and
    a liquid tight outer sheath extending in the longitudinal direction and surrounding the inner sheath and the ground heavy-current wire.

2. The charging cable of claim 1, wherein the second hollow area comprises a ring shaped cross section and/or is provided as a round pipe.

3. The charging cable of claim 1, wherein the first hollow area comprises an eight-like shaped cross section encompassing the power wires each in a ring shaped like cross section of the eight-like shaped cross section, such that the power wires are not separated from each other.

4. The charging cable of claim 1, further comprising two heavy-current power wires arranged in the second hollow area.

5. The charging cable of claim 1, wherein a cross section of the heavy-current power wires is 50 mm$^2$, a cross section of the heavy-current ground wire is 25 mm$^2$, a thickness of the power wire insulation is in a range of 1 to 2.5 mm, the outer sheath comprises a thickness in a range of 2 to 10 mm, and the cable comprises a length of 6 m.

6. The charging cable of claim 1, wherein the liquid coolant comprises at least one of oil, a water and glycol mixture, a water and salt mixture, and halogenated hydrocarbon compounds.

7. The charging cable of claim 1, wherein the inner sheath and/or the outer sheath comprise a polymer-based material and/or extruded polymer layers.

8. The charging cable of claim 1, wherein the outer sheath comprises a flexible metal tube arranged between the inner sheath and the outer sheath, and wherein the outer sheath is extruded on the flexible metal tube.

9. The charging cable of claim 1, wherein at least one of the ground conductor and the power conductors comprises copper or aluminum wires or strands.

10. The charging cable of claim 1, wherein the power wires and the inner sheath are arranged distant from each other and comprise wire spacers to arrange the power heavy-current wires and the inner sheath distant from each other.

11. The charging cable of claim 1, further comprising at least a sensor wire extending in the longitudinal direction and arranged within the inner sheath.

12. The charging cable of claim 1, further comprising at least a sensor wire extending in the longitudinal direction and arranged between the inner sheath and the outer sheath.

13. An electric vehicle supply equipment, EVSE, comprising:
a charging cable, the charging cable comprising:
   a ground heavy-current wire configured for serving as ground, the ground heavy-current wire comprising a ground conductor and extending in a longitudinal direction,
   at least two heavy-current power wires configured for conducting positive or negative direct current, DC, each of said heavy-current power wires comprising a power conductor and a power wire insulation surrounding said power conductor, the heavy-current power wires extending parallel to the ground wire,
   a liquid tight inner sheath extending in the longitudinal direction and surrounding the heavy-current power wires thereby defining a first hollow area between and around the heavy-current power wires configured to comprise liquid coolant to flow between the heavy-current power wires along the longitudinal direction, wherein the liquid tight inner sheath comprises:
      a second hollow area extending in the longitudinal direction, arranged adjacent to at least one of the heavy-current power wires and configured to comprise liquid coolant to flow within the second hollow area along the longitudinal direction, and
      a liquid tight outer sheath extending in the longitudinal direction and surrounding the inner sheath and the ground heavy-current wire;
a cooling unit; and
a charging connector,
wherein the charging cable is connected between the cooling unit and the charging connector, the cooling unit is configured for conveying the liquid coolant from the cooling unit through at least one of:
   the first and second hollow areas; and
   between the inner sheath and the outer sheath,
towards the charging connector, and
wherein the charging connector is configured for returning the liquid coolant through the first hollow area towards the cooling unit.

14. The EVSE of claim 13, wherein the EVSE is configured to charge the electric vehicle with a current rating equal to or greater than 500 A DC and/or a voltage rating equal to or greater than 1000 V DC.

15. A method for liquid cooling a heavy-current charging cable for charging an electric vehicle, the cable comprising:
   a ground heavy-current wire configured for serving as ground, the ground heavy-current wire comprising a ground conductor and extending in a longitudinal direction,
   at least two heavy-current power wires configured for conducting positive and negative direct current, DC, each of said heavy-current power wires comprising a power conductor and a power wire insulation surrounding said power conductor, the heavy-current power wires extending parallel to the ground wire,
   a liquid tight inner sheath extending in the longitudinal direction and surrounding the heavy-current power wires thereby defining a first hollow area between and around the heavy-current power wires, wherein the liquid tight inner sheath comprises:
      a second hollow area extending in the longitudinal direction, arranged adjacent to at least one of the heavy-current power wires, and
      a liquid tight outer sheath extending in the longitudinal direction and surrounding the inner sheath and the ground heavy-current wire, the method comprising the step of conveying liquid coolant through the first hollow area and the second hollow area.

* * * * *